Patented June 30, 1953

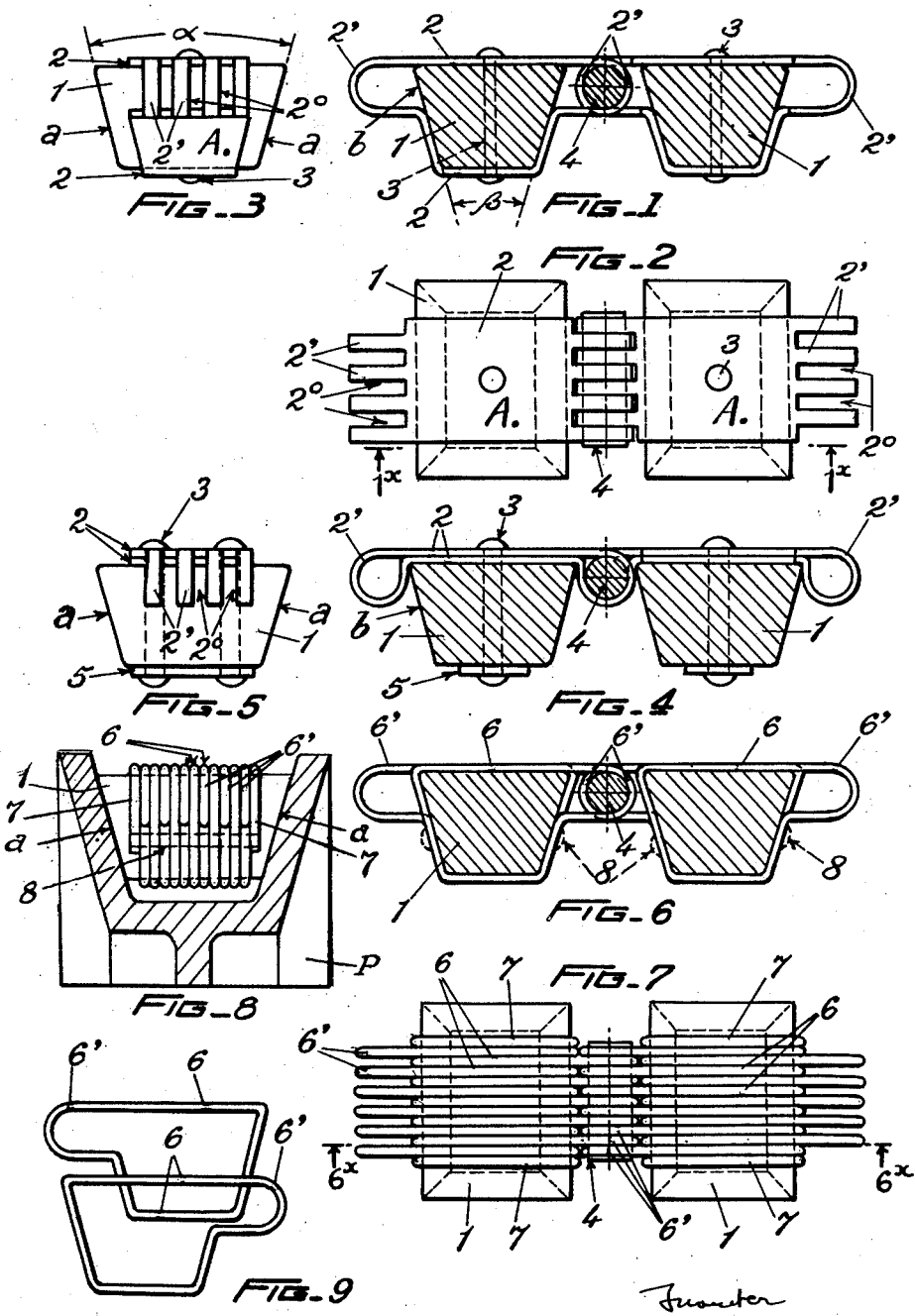

2,643,550

UNITED STATES PATENT OFFICE 2,643,550

ARTICULATED TRANSMISSION BELT FOR V-GROOVE PULLEYS

Cesare Giulio Borgna, Pinerolo, Italy

Application November 12, 1949, Serial No. 126,748
In Italy November 18, 1948

10 Claims. (Cl. 74—236)

1

The present invention relates to transmission belts for pulleys having a trapezoidal groove.

According to the invention the belt is constituted by a plurality of hingedly articulated elements, each comprising one or more wedge-shaped or frusto-pyramidal blocks, of material which is adapted to ensure good adhesion to the flanks of the grooves in the pulley with which they co-operate, each of the said blocks being mounted in a cage, from which it projects laterally, provided with members adapted to be hingedly articulated to the companion members of the cages of adjacent blocks.

Some forms of construction of the invention are shown by way of example in the accompanying drawings, in which: Figure 1 shows two elements of the belt in sectional elevation on the line 1x—1x in Figure 2, which is a plan view thereof; while Figure 3 is an end elevation thereof—Figures 4 and 5, analogous to Figures 1 and 3, show a modification—Figures 6, 7 and 8, similar to Figures 1, 2 and 3, show another modification; and Figure 9 shows in perspective two links of the cage shown in Figures 6 to 8.

The belt, in the form shown in Figures 1 to 3, is composed of a plurality of elements A, hingedly articulated to one another. Each element A is composed of a block 1, the section of which, in the transversal direction of the belt, is trapezoidal, so that its end faces $a$, which are to come into contact with the flanks of the trapezoidal grooved pulley P (Fig. 8) upon which the belt is to be employed, forms an angle $a$ equal to that formed by the said flanks. The block is preferably of trapezoidal cross section in the longitudinal direction of the belt also, but the angle $\beta$ formed by its lateral faces $b$ is not subject to any condition. The block 1, which is thus substantially of the shape either of a wedge or of a truncated pyramid, is made of leather or india-rubber or of some other at least moderately resilient material adapted to ensure good adhesion to the flanks of the pulley. Alternately it may be made of non-resilient material, such as wood, fibre or plastic, and provided on its end faces $a$ with coatings of resilient material.

Each block 1 is mounted in a skeleton frame or cage 2, constituted by a strip of sheet metal which embraces it longitudinally above and below, and partly also upon the sides $b$. The block 1 is preferably fixed in the cage 2, from which its ends $a$ project laterally, by a rivet 3. The strip 2, in the neighbourhood of the upper parts of the sides $b$ of the block, is prolonged beyond the block to form curved loops which, by means

2 of a plurality of deep indentations $2^0$, are subdivided into a plurality of eyelets $2'$, suitably spaced to accommodate the eyelets $2'$ of the cage of the adjacent elements. In this way a hinged connection is established between these elements, which is supplemented by a pivot 4, which is passed through the eyelets $2'$ of two adjacent elements which are in alignment with one another. The pivot 4 of each hinge is of non-metallic resilient material, so that the articulations do not require lubrication, while the belt as a whole acquires a certain capacity for elongation. In view of the conformation of the articulation, if heat is developed during operation, it is immediately radiated to the exterior by the metallic parts of the articulation itself.

The transmission belt described above, with which it is possible to form uniform continuous rings of any length, does not exhibit any point of diminished strength, like the joints existing in the belts hitherto employed. This belt, being constituted by a plurality of elements articulated like the links of an ordinary transmission chain, does not display the rigidity of the usual belts, and consequently it can effectively embrace pulleys which are even of very small diameter. It therefore permits of the transmission of quite large powers between two revolving members, even with high transmission ratios, without being excessively fatigued. This belt is absolutely silent, for only the ends $a$ of the blocks 1 come into contact with the flanks of the pulley. Such a belt, which is particularly suitable for speed-varying means with trapezoidally grooved pulleys of variable diameter, is intended for working on pulleys which have either smooth or slightly toothed grooves, and which may revolve in an oil bath.

In the modification shown in Figures 4 and 5, the sheet-metal cage 2 is flattened and the block is fixed thereto by means of rivets 3 anchored at the top to the cage and at the bottom to a counter-plate 5. In this case also the cage is extended on both sides by loops forming eyelets $2'$, constituting the accommodation for the hinge pins 4.

In the modification shown in Figures 6, 7, 8 and 9, the metallic skeleton or cage of each element is constituted by a plurality of trapezoidal steel-wire links 6, arranged side by side, the bases of which bear against the upper and lower faces of the block, while its inclined sides engage with the sides $b$ of the block. These links, as shown in Figure 9, are each provided at the top and on one side only with a loop $6'$ constituting the eyelet which is to cooperate in the formation of the hinges. These links are arranged on the block 1 with the loops projecting in opposite directions alternately, so that on each side the successive eyelets 6' are spaced in such a way as to provide accommodation for the eyelets of the cage of the adjacent element. The bunch of links on each block is preferably held together by two riders 7 serving as buttresses, also made of wire, which are forced on to the block 1. The assemblage of links may then be reinforced, by means of longitudinal welds 8 for example, along the inclined sides of the links. Such a construction, seeing that steel wire of great strength can be employed, is suitable for very high powers, and permits of mass production on a large scale.

In certain cases it may be advantageous to construct the cage in which the blocks are mounted of resilient material such as "Lignofol" (artificial or synthetic wood) or other synthetic material or plastic, employing in this case steel hinge pins.

I claim:

1. A transmission belt for pulleys having a trapezoidal groove comprising in combination, a plurality of belt elements, each of said belt elements comprising in combination, a block having inclined lateral faces adapted to fit into the groove of the pulley, and a plurality of wire links each having a shape equal to the longitudinal cross section of said block with a projecting loop portion on one side, said wire links being mounted on said block extending in longitudinal direction forming a cage with said loop portions projecting alternately in opposite directions towards adjacent elements whereby transversally adjacent loop portions are spaced from each other for receiving corresponding loop portions of the adjacent elements; and a plurality of pins, each pin passing through the interwoven loop portions of two adjacent elements hingedly articulating and connecting the same to each other.

2. A transmission belt for pulleys having a trapezoidal groove comprising in combination, a plurality of belt elements, each of said belt elements comprising in combination, a block having inclined lateral faces adapted to fit into the groove of the pulley, and a plurality of wire links each embracing said block and having loop portions projecting alternately in opposite directions towards adjacent elements whereby transversally adjacent loop portions are spaced from each other for receiving corresponding loop portions of the adjacent elements; and a plurality of pins each pin passing through the interwoven loop portions of two adjacent elements hingedly articulating and connecting the same to each other.

3. A transmission belt for pulleys having a trapezoidal groove comprising in combination, a plurality of belt elements, each of said belt elements comprising in combination, a block having inclined lateral faces adapted to fit into the groove of the pulley, and a plurality of wire links each having a shape equal to the longitudinal cross section of said block with a projecting loop portion on one side, said wire links being mounted on said block extending in longitudinal direction forming a cage with said loop portions projecting alternately in opposite directions towards adjacent elements whereby transversally adjacent loop portions are spaced from each other for receiving corresponding loop portions of the adjacent elements, and two fastening members having a shape equal to the longitudinal cross section of said block disposed on either side of the cage formed by said wire links and tightly embracing said blocks thereby securing said wire links against lateral movement; and a plurality of pins, each pin passing through the interwoven loop portions of two adjacent elements hingedly articulating and connecting the same to each other.

4. A transmission belt for pulleys having a trapezoidal groove comprising in combination, a plurality of belt elements, each of said belt elements comprising in combination, a block consisting of a slightly resilient material having inclined lateral faces adapted to fit into the groove of the pulley, and a plurality of wire links each having a shape equal to the longitudinal cross section of said block with a projecting loop portion on one side, said wire links being mounted on said block extending in longitudinal direction forming a cage with said loop portions projecting alternately in opposite directions towards adjacent elements whereby transversally adjacent loop portions are spaced from each other for receiving corresponding loop portions of the adjacent elements; and a plurality of pins, each pin passing through the interwoven loop portions of two adjacent elements hingedly articulating and connecting the same to each other.

5. A transmission belt for pulleys having a trapezoidal groove comprising in combination, a plurality of belt elements, each of said belt elements comprising in combination, a block having inclined lateral faces adapted to fit into the groove of the pulley, and a plurality of metal wire links each having a shape equal to the longitudinal cross section of said block with a projecting loop portion on one side, said wire links being mounted on said block extending in longitudinal direction welded together and forming a cage with said loop portions projecting alternately in opposite directions towards adjacent elements whereby transversally adjacent loop portions are spaced from each other for receiving corresponding loop portions of the adjacent elements, and two fastening members having a shape equal to the longitudinal cross section of said block disposed on either side of the cage formed by said wire links and tightly embracing said blocks thereby securing said wire links against lateral movement; and a plurality of pins, consisting of a non-metallic material, each pin passing through the interwoven loop portions of two adjacent elements hingedly articulating and connecting the same to each other.

6. A transmission belt for pulleys having a trapezoidal groove comprising in combination, a plurality of belt elements, each of said belt elements comprising in combination, a block having inclined lateral faces adapted to fit into the groove of the pulley, and a plurality of non-metallic links each having a shape equal to the longitudinal cross section of said block with a projecting loop portion on one side, said non-metallic links being mounted on said block extending in longitudinal direction forming a cage with said loop portions projecting alternately in opposite directions towards adjacent elements whereby transversally adjacent loop portions are spaced from each other for receiving corresponding loop portions of the adjacent elements; and a plurality of metal pins, each pin passing through the interwoven loop portions of two adjacent elements hingedly articulating and connecting the same to each other.

7. A transmission belt element comprising in combination, a block having inclined lateral faces; a plurality of wire links each having a shape equal to the longitudinal cross section of said block with a projecting loop portion, on one side, said links being mounted on said block extending in longitudinal direction forming a cage with said loop portions projecting alternately in opposite directions whereby transversally adjacent loop portions are spaced from each other for receiving corresponding loop portions of an adjacent element; and two fastening members having a shape equal to the longitudinal cross section of said block disposed on said block on either side of said cage formed by said links and tightly embracing said blocks thereby securing said links against lateral movement.

8. A transmission belt element comprising in combination, a block of a slightly resilient material having inclined lateral faces; a plurality of wire links each having a shape equal to the longitudinal cross section of said block with a projecting loop portion, on one side, said links being mounted on said block extending in longitudinal direction forming a cage with said loop portions projecting alternately in opposite directions whereby transversally adjacent loop portions are spaced from each other for receiving corresponding loop portions of an adjacent element; and two fastening members having a shape equal to the longitudinal cross section of said block disposed on said block on either side of said cage formed by said links and tightly embracing said blocks thereby securing said links against lateral movement.

9. A transmission belt element comprising in combination, a block having inclined lateral faces; a plurality of wire links each having a shape equal to the longitudinal cross section of said block with a projecting loop portion, on one side, said links being mounted on said block extending in longitudinal direction welded together and forming a cage with said loop portions projecting alternately in opposite directions whereby transversally adjacent loop portions are spaced from each other for receiving corresponding loop portions of an adjacent element; and two fastening members having a shape equal to the longitudinal cross section of said block disposed on said block on either side of said cage formed by said links and tightly embracing said blocks thereby securing said links against lateral movement.

10. A transmission belt for pulleys having a trapezoidal groove, comprising in combination, a plurality of belt elements, each of said belt elements comprising in combination, a block consisting of a resilient material and having inclined lateral faces adapted to fit into the groove of the pulley, and a plurality of metal wire links each having a shape conforming to the longitudinal cross-section of said block with a projecting loop portion on one side, said wire links being mounted on said block extending in longitudinal direction embracing the same and forming a cage with said loop portions projecting alternately in opposite directions towards adjacent belt elements whereby transversely adjacent loop portions are spaced from each other for receiving corresponding loop portions of the adjacent belt elements, and two fastening members having a shape conforming to the longitudinal cross-section of said block mounted on said block on either side of the cage formed by said wire links and tightly embracing said blocks thereby securing said wire links against lateral movement, said wire links and said fastening members being welded together; and a plurality of pins, consisting of a non-metallic material, each pin passing through the interwoven loop portions of two adjacent elements hingedly articulating and connecting the same to each other.

CESARE GIULIO BORGNA.

References Cited in the file of this patent

UNITED STATES PATENTS

| Number | Name | Date |
|---|---|---|
| 502,798 | Wilbur | Aug. 8, 1893 |
| 1,792,242 | Reeves | Feb. 10, 1931 |
| 1,940,297 | Diamond | Dec. 19, 1933 |

FOREIGN PATENTS

| Number | Country | Date |
|---|---|---|
| 292,312 | Great Britain | June 21, 1928 |